Jan. 18, 1955 J. J. STONE, JR 2,700,149

POLARITY SELECTOR

Filed Nov. 18, 1952 2 Sheets-Sheet 1

INVENTOR.
Joseph J. Stone, Jr.
BY
Roland A. Anderson
ATTORNEY

Jan. 18, 1955 J. J. STONE, JR 2,700,149

POLARITY SELECTOR

Filed Nov. 18, 1952 2 Sheets-Sheet 2

INVENTOR.
Joseph J. Stone, Jr.
BY
Roland A. Anderson
ATTORNEY 2,700,149

POLARITY SELECTOR

Joseph J. Stone, Jr., Clinton, Tenn., assignor to the United States of America as represented by the United States Atomic Energy Commission Application November 18, 1952, Serial No. 321,207

5 Claims. (Cl. 340—174)

The present invention relates to electrical circuits and more especially to a polarity selector adapted to receive electrical signals and to distinguish between those which are initially positive-going and those which are initially negative-going.

In many fields of electronic instrumentation, it is required to sort events represented by electrical impulses into one of two alternative groups. For example, the events may be represented by positive and negative electrical pulses, or by roughly sinusoidal signals 180° out of phase. The sorting circuit must be able to receive signals of either initial polarity and to produce an output signal indicative of the type of signal received. In electronic computers, binary numbers may be represented by positive or negative magnetization of the recording medium, which may be wire, a drum, or magnetic tape. In order to recover a number written or stored in such magnetic memory system, the medium may be scanned by a pick-up head. The voltage induced in the winding of that head by the recorded information may be amplified and impressed upon a polarity selector circuit which must produce a binary signal responsive thereto. In many applications it is desired that a first signal be produced for each bit of information read by the magnetic head, and that a second pulse be produced if the bit of information represents one binary character, but no second pulse be produced if the bit of information represents the other binary character.

Accordingly, it is a primary object of my invention to provide a circuit adapted to receive binary electrical signals of either character and to produce an output signal indicative of the binary character of the input signal. A further object of my invention is to receive binary signals of opposite polarity and to deliver a first pulse output corresponding to each input signal and a second pulse output corresponding to each input signal of a selected binary character.

Figure 1:
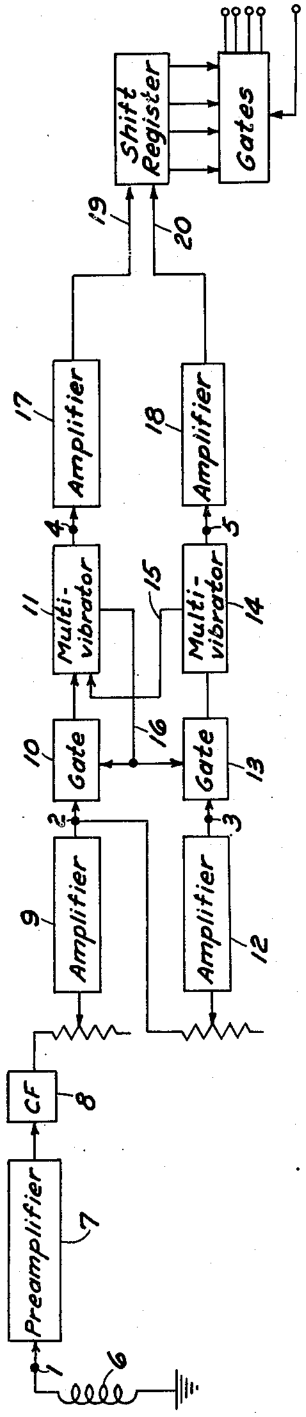
Figure 2:
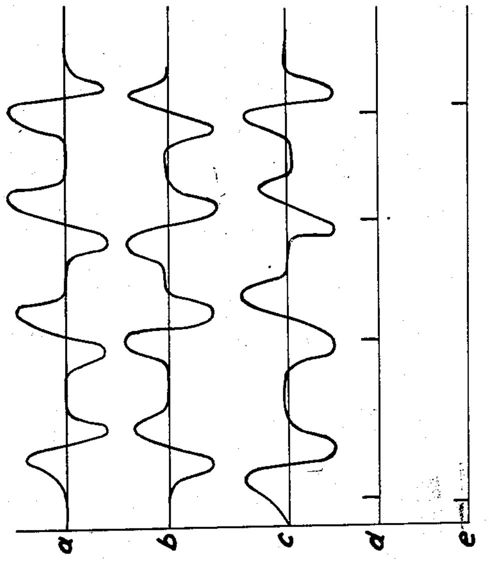
Figure 3:
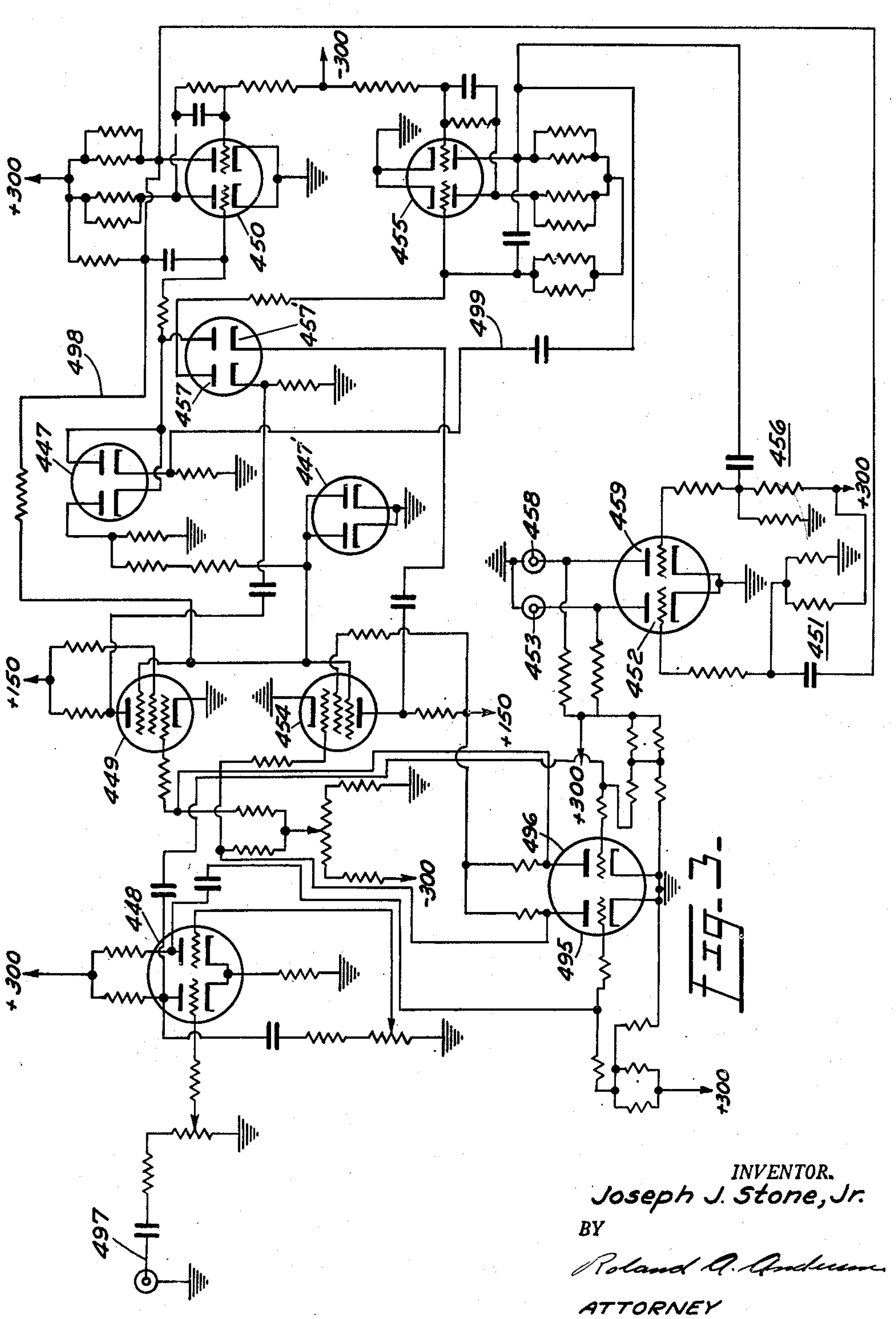

Further objects and numerous advantages of my invention will become apparent from the following detailed description, wherein Fig. 1 of the drawing is a block diagram showing a preferred embodiment of the invention as it may be used in a computing machine;

Fig. 2 represents schematically the wave forms of various signals at selected points along the circuit of Fig. 2; and Fig. 3 is a detailed schematic diagram of a preferred embodiment of the invention.

Referring now to Fig. 1, when the recording medium passes near the pick-up head the magnetic flux from a recorded signal on the medium passes through the head. The magnitude of the flux may first increase to a maximum value, then return to zero as the magnetized region of the recording medium is passed over. If the flux rise time and fall time are approximately equal, then there is induced in the pick-up winding 6 a voltage pulse of one polarity, followed by a second pulse of the opposite polarity and of approximately the same magnitude. The polarity of the first pulse depends upon the flux direction through the head, and this in turn is determined by the polarity of the recorded signal. In a computer where binary 1 is recorded by applying a positive voltage pulse to a recording and binary 0 is recorded by applying a negative voltage pulse, the signal recovered from the memory is a positive pulse followed by a negative pulse for a 1 and a negative pulse followed by a positive pulse for a 0. The curve of Fig. 2*a* shows the wave form of typical binary signals derived from a magnetic recording medium.

The derived signal pulses may be amplified in a conventional preamplifier 7 and coupled through a cathode follower circuit 8 to the polarity selector. The latter circuit produces two pulse outputs; the first, a "shift" pulse for resetting a storage register to zero as each input pulse is received, and the second a "signal" pulse for adding one to the number in the register only when the input signal is binary 1. In these registers, described more fully in co-pending application Serial No. 277,816 of Stone, Bettis, and Mann, filed March 21, 1952, the shift and signal pulses set concatenated binary counter stages to represent the several digits of the binary number read off the storage medium.

In operation of the embodiment of Fig. 1, assume an input signal which goes first positive, then negative. The signal is amplified and inverted in polarity by amplifier 9, so that lead 2 at first goes negative. Gate 10 will produce an output pulse only if it receives a positive signal, so the negative signal is rejected and multivibrator 11 cannot be triggered. The signal from lead 2 is amplified and inverted by amplifier 12, so that lead 3 first goes positive, causing gate 13 to conduct, triggering multivibrator 14. An output from this multivibrator on lead 15 triggers multivibrator 11, which produces a first pulse on lead 4 and a second pulse on lead 16, the latter being coupled to the suppressor grids of gates 10, 13. The pulse width of multivibrator 11 is so adjusted that it holds gates 10 and 13 non-conducting for the duration of both positive and negative portions of the signal, and recovers during the dead time between signals. The output waveforms of the two multivibrators may be coupled through differentiator networks in peaking amplifiers 17, 18 to produce sharp output pulses on "shift" lead 19 and "signal" lead 20.

A signal comprising a first negative pulse, followed by a positive pulse, is amplified and the two component pulses are inverted in polarity by amplifier 9, so that lead 2 receives a positive pulse followed by a negative pulse. Gate 10 passes the positive pulse to trigger multivibrator 11. That circuit produces a pair of outputs: a negative pulse on lead 16, which is coupled to gates 10, 13 to block the second or negative part of the pulse on lead 2 and the second or positive part of the pulse on lead 3, and a negative pulse on lead 4. The pulses on lead 2 are amplified and inverted in amplifier 12 and delivered to gate 13 as a negative pulse followed by a positive pulse. That gate is blocked by a negative pulse from lead 16, so that no pulse is allowed to pass to multivibrator 14. Therefore no pulse appears on leads 5 or 20 to correspond with the "shift" pulse on lead 4. The absence of a pulse on lead 20 serves to indicate that the first pulse of the incoming signal from magnetic head 6 was negative, while the presence of a pulse on "signal" lead 20 indicates an initially positive-going signal.

Typical pulse waveforms at various points of the circuit are illustrated in Fig. 2. The four-digit binary number 1001 read off magnetic tape by a magnetic transducer may produce a sequence of four pulses as shown in Fig. 2*a*. The first and fourth ("1") pulses are initially positive-going voltage alternations, while the second and third ("0") pulses are initially negative-going alternations. The signals after inversion in amplifier 9 are shown in Fig. 2*b*, and after another inversion in amplifier 12 assume the waveform of Fig. 2*c*. The four "shift" pulses produced on lead 19 are shown in Fig. 2*d*, and the two "1" pulses produced on lead 20 by the initially positive-going alternations are shown in Fig. 2*e*.

Circuit details of a preferred embodiment of my invention are shown in Fig. 3. Input signals from the cathode follower 8 may be applied through input 497 and a gating control potentiometer to the control grid of one section of a phase inverter 448. Output signals may be taken from the two anodes of the inverter, a positive signal from one anode, and a negative signal from the other, due to the cathode coupling between sections and the phase inversion in each amplifier. The signals are amplified and inverted in stages 495, 496. If the input signal to channel 497 is a signal first going positive, signifying binary 1, a positive pulse is first delivered to the control grid of open gate of 449. The gate produces a negative pulse which trips delay multivibrator 455 through diode 457, sending a negative pulse to differentiating circuit 456 and also along line 499, through one section of diode 447, to trip delay multivibrator 450. The latter circuit produces a sharp pulse across differentiator network 451. The differentiated pulses may be further amplified in amplifiers 452, 459, the anodes of which are coupled to the outputs 453, 458. Since both delay multivibrators 450, 455 are tripped by a binary 1 input signal, it is evident that both outputs 453, 458 will receive a pulse when a 1 signal is received at the input 497.

If a binary 0 signal, one which initially goes negative, is incident on input 497, a negative pulse from the phase inverter 448 is inverted by amplifier 496 and impressed upon the control grid of gate 454, which controls the input to delay multivibrator 450. The positive pulse will actuate the gate tube, producing a negative pulse which is coupled through diode 457' to trigger the delay multivibrator. This action produces a square-wave output which is differentiated by a network 456, amplified in a conventional amplifier 459, and delivered to the output 458. The square-wave from multivibrator 450 is also coupled back along line 498 to the suppressor grids of gates 449, 454, and closes those gates for a time sufficient to block the remainder of the input signal, so that the positive pulse which follows the negative pulse for binary 0 cannot get through the gates to produce an output pulse. Since multivibrator 450 was triggered but multivibrator 455 cannot be tripped, it is apparent that a binary 0 signal produces an output pulse only in channel 458.

The diodes employed are preferably type 6AL5, the gate tubes are preferably type 6AS6, the phase inverter is preferably type 12AU7, and the remaining tubes of the circuit may be of type 12AT7.

Having described my invention, I claim:

1. A polarity selector circuit having a single input and a pair of outputs comprising means for receiving a sequence of electrical pulses at said input, means for deriving a pair of pulses of opposite polarity from each of said received pulses, first and second bistable devices, respective pulse blocking means interposed between said pulse deriving means and each of said bistable devices, means for deriving a first pulse from each of said bistable devices responsive to each input pulse impressed thereon, means for deriving a second pulse from said first bistable device for actuating said blocking devices, and means for deriving a second pulse from said second bistable device responsive to each input pulse impressed thereon for actuating said first bistable device.

2. An electrical circuit for determining the initial polarity of electrical pulse signals impressed thereon comprising first and second bistable devices having input and output circuits associated therewith, first and second gating circuits associated with the input circuits of respective bistable devices, means for receiving input pulses and deriving a pair of pulses of opposite polarity from each input pulse, means coupling said derived pulses to respective gating circuits, means coupled to one of said bistable devices for blocking both of said gate circuits, and means for coupling the output of said second bistable device to the input of said first bistable device, whereby a pulse is produced at the output of said first bistable device for each pulse received at said input circuit, and a pulse is produced at the output of said second bistable device only for those pulses of a selected polarity.

3. A polarity selector circuit of the character described comprising a phase inverter tube having an input circuit and a pair of output circuits associated therewith, first and second gating circuits coupled to corresponding output circuits, first and second delay multivibrator circuits coupled to corresponding gating circuits and adapted to be triggered by pulses therefrom, circuit means coupling the output of said second multivibrator circuit to the input of said first multivibrator circuit, circuit means for blocking both of said gating circuits responsive to the triggering of said multivibrator, and a pair of pulse output circuits coupled to corresponding multivibrators for receiving a pulse responsive to each input pulse from said first multivibrator, and a pulse responsive only to each input pulse of a selective initial polarity from said second multivibrator.

4. A reading device for recorded magnetic signals including a magnetic pick-up head for deriving a voltage pulse of one polarity followed by another pulse of opposite polarity from a bit of recorded information comprising: a first amplifier circuit coupled to receive said pulses from said head and to invert the polarity of said pulses, a second amplifying circuit coupled to the output of said first amplifier for re-inverting the polarity of said pulses, first and second gate circuits coupled respectively to said first and second amplifier circuits, first and second trigger circuits coupled respectively to said gate circuits and adapted to produce an output pulse responsive to the pulse from said gate circuits, means for blocking both of said gate circuits responsive to a triggering of said first trigger circuit, and means for triggering said first trigger circuit responsive to triggering of said second trigger circuit.

5. A polarity selector circuit of the character described comprising an input for receiving signals characterized by a pair of pulses of opposite polarity; a first amplifier coupled to said input; a second amplifier coupled to said first amplifier and adapted to produce output pulses inverted in polarity from input pulses applied thereto; third and fourth amplifiers coupled respectively to the outputs of said first and second amplifiers; first and second gating circuits coupled to the outputs of said third and fourth amplifiers, respectively, and maintained normally in receptive condition; first and second circuit networks for producing a single square-wave impulse upon receipt of a trigger pulse from said respective gating circuits; circuit means coupling the output of said first network to both of said gating circuits and adapted to render said circuits non-receptive to input pulses; circuit means coupling the output of said second network to the input of said first network to trigger the same; respective networks for differentiating the square-wave impulses from said circuit networks; and a pair of output circuits for delivering said differentiated pulses to a utilization device.

References Cited in the file of this patent

UNITED STATES PATENTS

| | | |
|---|---|---|
| 2,536,228 | Ruysdael | Jan. 2, 1951 |
| 2,675,427 | Newby | Apr. 13, 1954 |